(12) United States Patent
Sylvain

(10) Patent No.: US 9,078,174 B2
(45) Date of Patent: Jul. 7, 2015

(54) CALL TRANSFER FOR AN INTEGRATED WIRELINE AND WIRELESS SERVICE

(75) Inventor: Dany Sylvain, Gatineau (CA)

(73) Assignee: RPX CLEARINGHOUSE LLC, Dover, DE (US)

( * ) Notice: Subject to any disclaimer, the term of this patent is extended or adjusted under 35 U.S.C. 154(b) by 693 days.

(21) Appl. No.: 10/784,743

(22) Filed: Feb. 23, 2004

(65) Prior Publication Data

US 2005/0003821 A1 Jan. 6, 2005

Related U.S. Application Data

(60) Provisional application No. 60/472,152, filed on May 21, 2003.

(51) Int. Cl.
*H04W 36/00* (2009.01)
*H04W 36/14* (2009.01)
*H04W 88/16* (2009.01)
*H04L 29/06* (2006.01)

(52) U.S. Cl.
CPC ...... *H04W 36/0027* (2013.01); *H04W 36/0066* (2013.01); *H04W 88/16* (2013.01); *H04L 65/1023* (2013.01); *H04W 36/14* (2013.01)

(58) Field of Classification Search
CPC ............ H04W 36/04; H04W 36/0066; H04W 36/0027; H04W 36/14; H04W 36/18; H04W 88/16; H04W 88/181; H04W 8/06; H04L 12/6418; H04L 12/66; H04L 63/083; H04L 63/0869; H04L 65/605; H04L 65/104; H04L 65/1026; H04L 65/103; H04L 65/1036
USPC ........ 455/422.1, 426.1, 432.1, 436, 438, 439, 455/440, 442, 443, 444, 437, 552.1, 553.1
See application file for complete search history.

(56) References Cited

U.S. PATENT DOCUMENTS 5,260,988 A 11/1993 Schellinger et al. ............ 379/59
5,579,375 A 11/1996 Ginter
(Continued)

FOREIGN PATENT DOCUMENTS

WO 02/19750 3/2002 ............... H04Q 7/32

OTHER PUBLICATIONS

A Report on the Status of Wireless Access to 2-1-1, Mar. 2003, by Strover and Cunningham pp. 8-10.
(Continued)

*Primary Examiner* — Nizar Sivji
(74) *Attorney, Agent, or Firm* — Withrow & Terranova, P.L.L.C.

(57) ABSTRACT

Calls are established with a single mobile terminal through either a wireless network or via a terminal adaptor over the PSTN or a packet network. The terminal adaptor and mobile terminal communicate via a local wireless interface. The mobile terminal may facilitate cellular calls via the wireless network as well as PSTN or packet-based calls via the terminal adaptor. The mobile terminal may initiate a handoff when it is involved in a call through the wireless network and within a communication zone of the terminal adaptor. The handoff will establish a connection between the wireless switch, which is currently supporting the call, and the mobile terminal through the terminal adaptor. Once the connection with the mobile terminal through the terminal adaptor is established, the call is transitioned to the new connection and the mobile terminal will transfer to the local wireless interface to support the call.

33 Claims, 11 Drawing Sheets

(56) References Cited

U.S. PATENT DOCUMENTS

| | | | |
|---|---|---|---|
| 5,659,598 A | 8/1997 | Byrne et al. | 455/436 |
| 5,722,068 A | 2/1998 | Bartle et al. | 455/421 |
| 5,737,703 A * | 4/1998 | Byrne | 455/442 |
| 5,751,789 A | 5/1998 | Farris et al. | 379/34 |
| 5,890,054 A | 3/1999 | Logsdon et al. | |
| 5,901,359 A | 5/1999 | Malmstrom | |
| 5,940,756 A | 8/1999 | Sibecas et al. | |
| 6,014,377 A | 1/2000 | Gillespie | 370/351 |
| 6,052,597 A | 4/2000 | Ekstrom | |
| 6,104,799 A | 8/2000 | Jain et al. | |
| 6,154,650 A | 11/2000 | Abidi et al. | 455/433 |
| 6,181,938 B1 * | 1/2001 | Salmela et al. | 455/433 |
| 6,216,000 B1 * | 4/2001 | Blumhardt | 455/435.2 |
| 6,243,581 B1 * | 6/2001 | Jawanda | 455/432.2 |
| 6,327,470 B1 | 12/2001 | Ostling | |
| 6,363,246 B1 | 3/2002 | Williams et al. | 455/403 |
| 6,373,828 B1 * | 4/2002 | Stewart et al. | 370/331 |
| 6,411,802 B1 | 6/2002 | Cardina et al. | 455/404 |
| 6,424,647 B1 | 7/2002 | Ng et al. | 370/352 |
| 6,438,384 B1 | 8/2002 | Chen | 455/462 |
| 6,445,921 B1 * | 9/2002 | Bell | 455/426.1 |
| 6,487,410 B1 * | 11/2002 | Kontio et al. | 455/437 |
| 6,611,507 B1 * | 8/2003 | Hottinen et al. | 370/331 |
| 6,633,636 B1 | 10/2003 | McConnell et al. | |
| 6,766,170 B1 | 7/2004 | Aretz et al. | |
| 6,791,988 B1 | 9/2004 | Hameleers et al. | |
| 6,940,844 B2 | 9/2005 | Purkayastha et al. | |
| 6,941,156 B2 | 9/2005 | Mooney | 455/553.1 |
| 6,985,720 B2 | 1/2006 | Qu et al. | |
| 6,987,988 B2 | 1/2006 | Uchiyama | 455/557 |
| 7,043,248 B2 | 5/2006 | Hallenstal et al. | |
| 7,058,415 B2 | 6/2006 | Bushnell et al. | |
| 7,136,375 B1 * | 11/2006 | Koistinen | 370/352 |
| 7,302,258 B1 * | 11/2007 | Sylvain | 455/432.1 |
| 7,522,632 B2 | 4/2009 | La Porta et al. | |
| 2002/0024947 A1 | 2/2002 | Luzzatti et al. | |
| 2002/0059434 A1 * | 5/2002 | Karaoguz et al. | 709/228 |
| 2002/0061744 A1 | 5/2002 | Hamalainene et al. | |
| 2002/0085516 A1 | 7/2002 | Bridgelall | 370/329 |
| 2002/0106028 A1 | 8/2002 | Thyssen | 375/243 |
| 2002/0110112 A1 | 8/2002 | Tuomi | 370/352 |
| 2002/0147008 A1 * | 10/2002 | Kallio | 455/426 |
| 2003/0008682 A1 | 1/2003 | Emerson, III | 455/557 |
| 2003/0134650 A1 | 7/2003 | Sundar et al. | |
| 2003/0214940 A1 | 11/2003 | Takken | 370/352 |
| 2003/0224795 A1 | 12/2003 | Wilhoite et al. | |
| 2004/0132485 A1 | 7/2004 | Charney et al. | 455/552.1 |
| 2004/0160932 A1 | 8/2004 | Yegoshin | |
| 2004/0202940 A1 | 10/2004 | Kramer et al. | |
| 2004/0203606 A1 | 10/2004 | Souissi et al. | |
| 2005/0148353 A1 | 7/2005 | Hicks, III et al. | |
| 2005/0159153 A1 | 7/2005 | Mousseau et al. | |
| 2005/0207395 A1 * | 9/2005 | Mohammed | 370/352 |

OTHER PUBLICATIONS

Adachi et al, "A Handoff Examination of a Hybrid System Using Cellular and Ad-Hoc Modes," IEICE Transactions on Communications, Institute of Electronics Information and Communications Enginerring, Tokyo, Japan, Nov. 2000, vol. E83-B, No. 11, pp. 2494-2500, XP001065366.

International Search Report for PCT/IB2004/001668, mailed Jul. 5, 2005.

International Search Report for PCT/IB2004/001672 mailed Jan. 27, 2005.

* cited by examiner

CALL TRANSFER FOR AN INTEGRATED WIRELINE AND WIRELESS SERVICE

This application claims the benefit of U.S. provisional patent application Ser. No. 60/472,152, filed May 21, 2003, the disclosure of which is hereby incorporated by reference in its entirety.

FIELD OF THE INVENTION

The present invention relates to mobile communications, and in particular to allowing a single mobile terminal to transition from communicating over a wireless network to communicating over the public switched telephone or packet network.

BACKGROUND OF THE INVENTION

Today's telephony users generally have at least one wireline-based telephone receiving services through the public switched telephone network (PSTN) and a mobile telephone receiving services through a cellular network. These wireline and mobile telephones are incompatible, and are thus incapable of facilitating communications over both the cellular and public switched networks. As such, telephony users must juggle multiple telephones, using one telephone to make and receive calls via the cellular network, and another to make and receive calls via the PSTN. Given the multiple telephones, callers must keep track of multiple directory numbers. Additionally, incoming calls are generally free through the service providers of the PSTN, while cellular service providers charge for such incoming calls. Accordingly, there is a need for a technique to allow a single telephony device to interface with both the cellular network and the PSTN in an effective and efficient manner.

Given the increase in packet-based voice calls and the movement toward using packet networks to support calls normally supported by the PSTN over packet networks, there is a need to for a technique to allow a single telephony device to interface with both the cellular network and a packet network. Given the inherent mobility associated with mobile telephones, there is also a need to provide an efficient transfer mechanism to transition a call through the cellular network to a call through the PSTN or packet network, when communications via the PSTN or packet network are desired or necessary.

SUMMARY OF THE INVENTION

The present invention relates to a communication environment where calls are established with a single mobile terminal through either a wireless network or via a terminal adaptor over the public switched telephone network (PSTN) or a packet network. The terminal adaptor is capable of wirelessly communicating with the mobile terminal. As such, the mobile terminal may facilitate traditional cellular calls via the wireless network as well as traditional PSTN or packet-based calls via the terminal adaptor. The terminal adaptor and mobile terminal communicate via a local wireless interface, and as such, communications via the PSTN or packet network through the terminal adaptor are only possible within a limited communication zone supported by the terminal adaptor. When the mobile terminal is involved in a call through the wireless network and is within the communication zone of the terminal adaptor, the mobile terminal may initiate a handoff. The handoff will establish a connection between the wireless switch, which is currently supporting the call, and the mobile terminal through the terminal adaptor using a local wireless interface. Once the connection with the mobile terminal through the terminal adaptor is established, the call is transitioned to the new connection and the mobile terminal will transfer to the local wireless interface to support the call. In one embodiment, establishment of the new connection and transfer of the call to the connection are supported by a service node, which can interact with the wireless network, PSTN, or packet network to provide call signaling and control.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A-2D provide a communication call flow diagram wherein a handoff is facilitated from a call with the mobile terminal through the cellular access network to the mobile terminal via the terminal adaptor.

Figure 3:
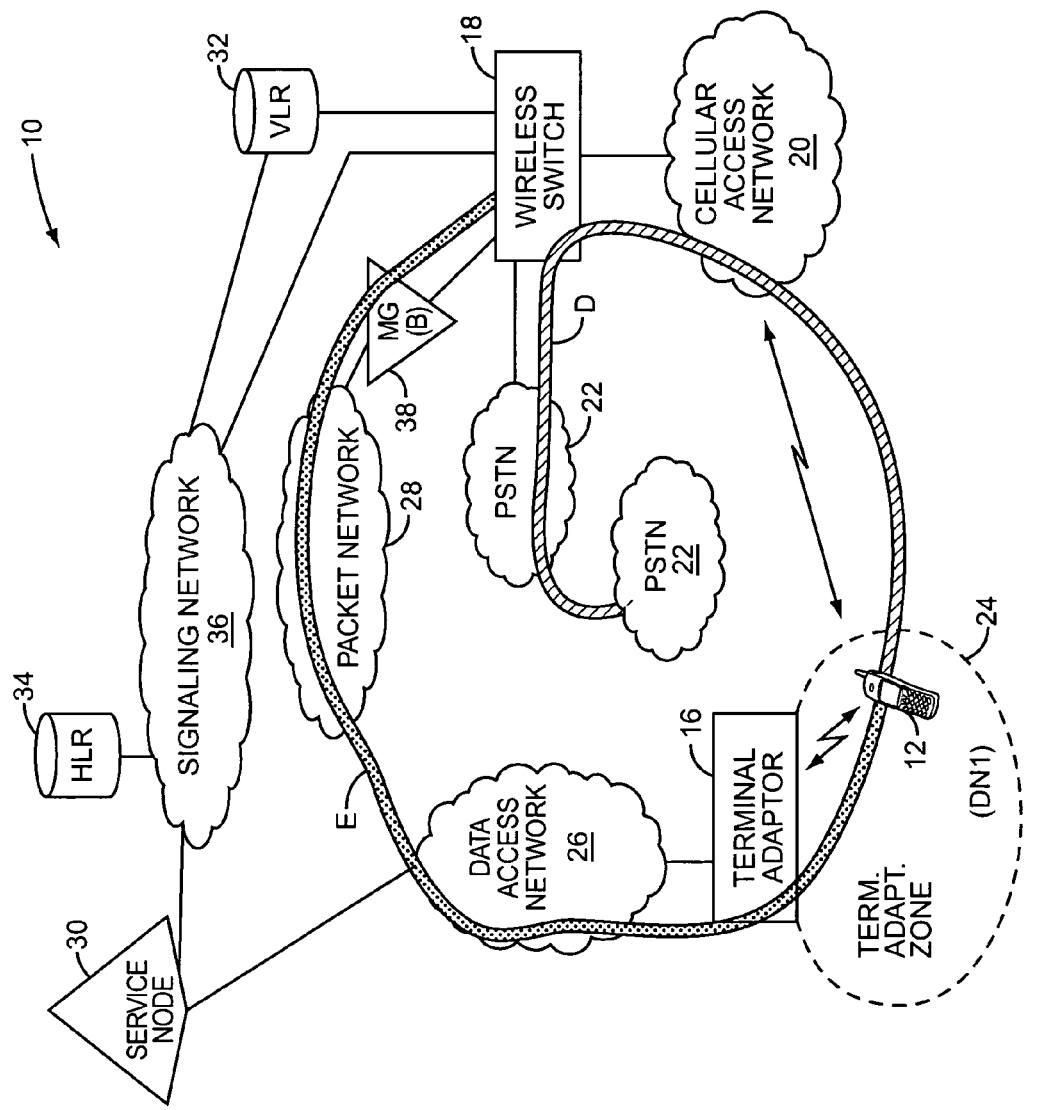

FIG. 3 is a block representation of a communication environment wherein the call is transferred to a connection between the wireless switch and the mobile terminal via the terminal adaptor according to a second embodiment of the present invention.

Figure 4:
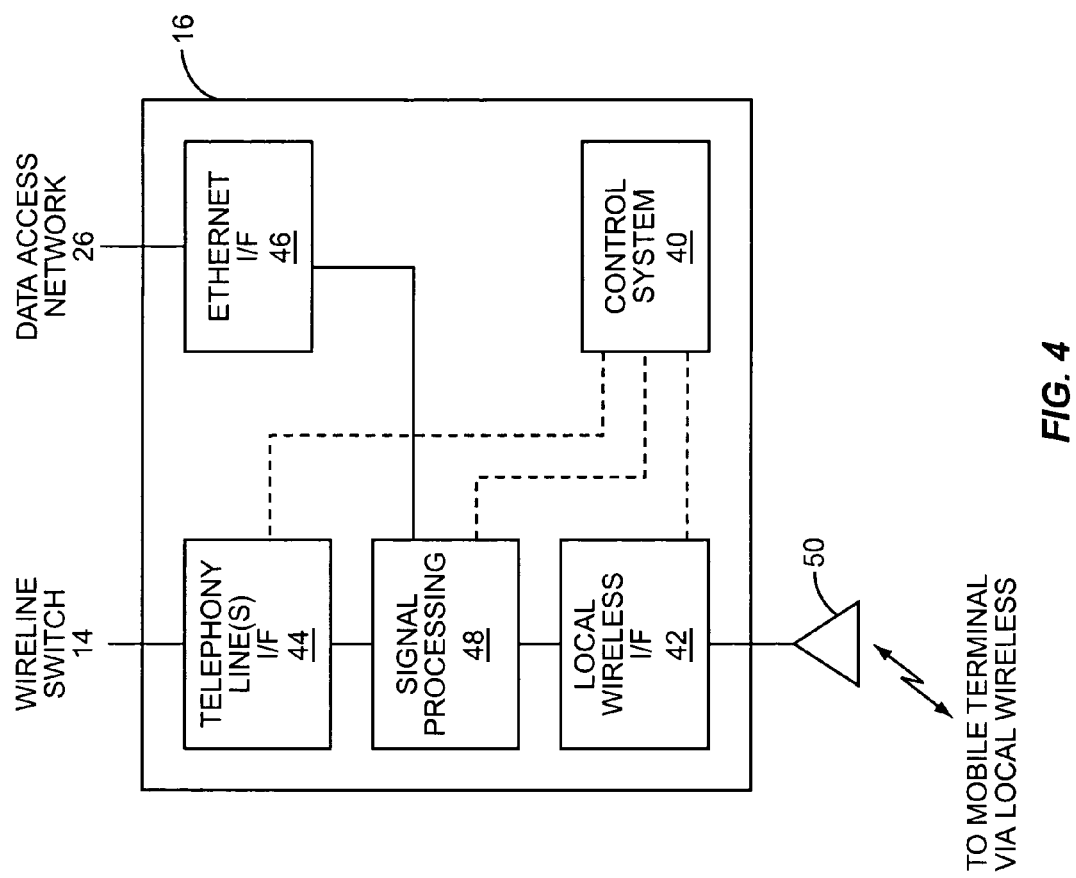

FIG. 4 is a block representation of a terminal adaptor according to one embodiment of the present invention.

Figure 5:
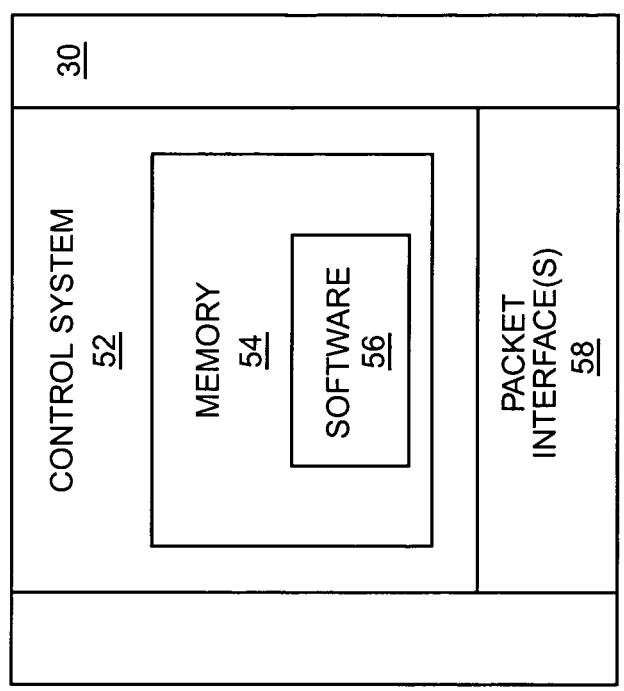

FIG. 5 is a block representation of a service node according to one embodiment of the present invention.

Figure 6:
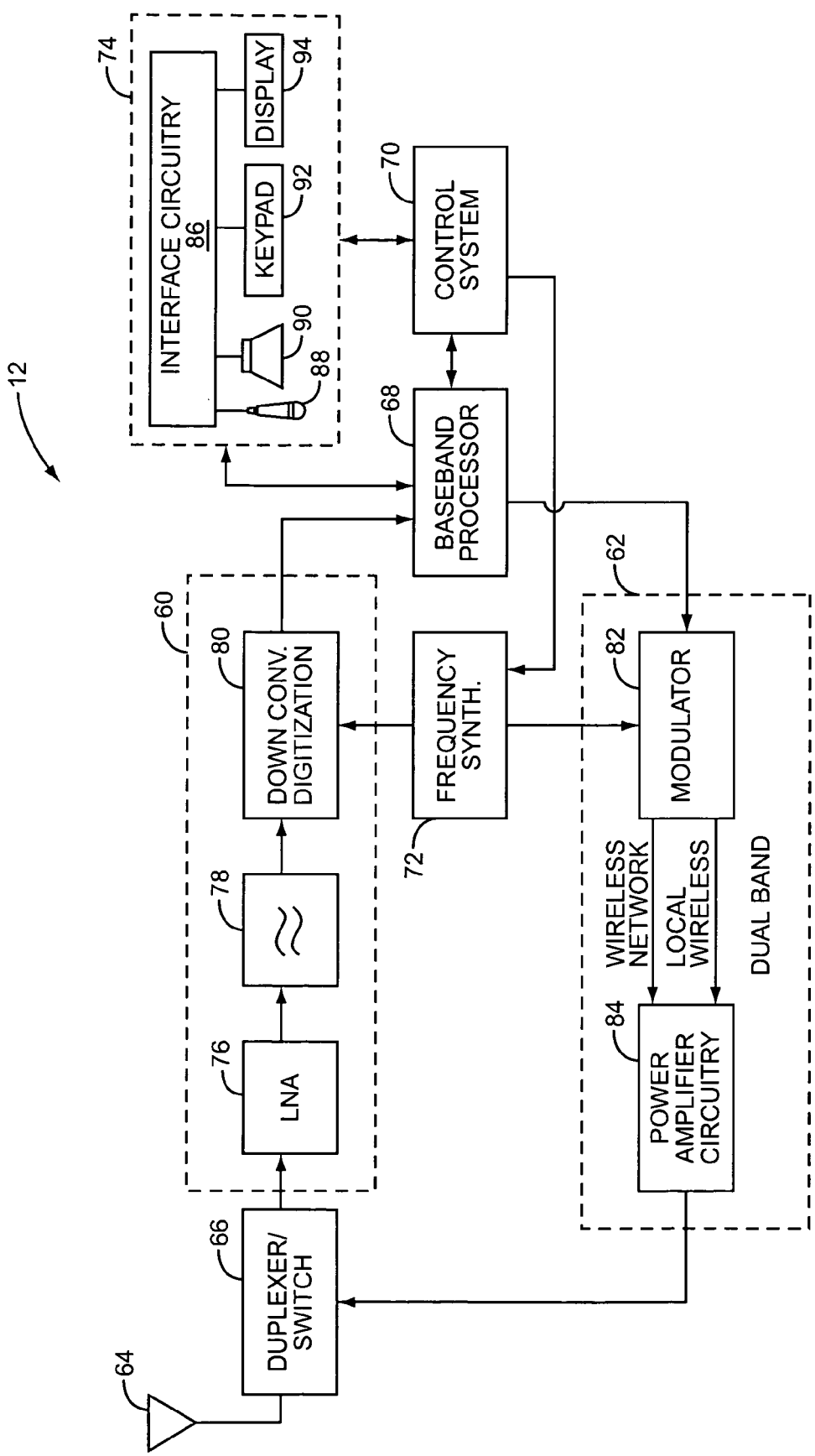

FIG. 6 is a block representation of a mobile terminal according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to providing a mobile terminal that is capable of communication via a cellular-based wireless network, as well as via the public switched telephone network (PSTN) or a packet network through a terminal adaptor. The terminal adaptor is coupled to the PSTN in traditional fashion or to a packet network though an available access network, and communicates wirelessly with the mobile terminal using local wireless access technology, such as traditional analog and digital cordless technologies, 802.11 wireless local area network technologies, and Bluetooth technology. The mobile terminal is preferably associated with a primary directory number for PSTN access, and is associated with a temporary directory number for cellular access. Communications with the wireless network can use any available cellular access technology, such as time division multiple access (TDM), code division multiple access (CDMA), and orthogonal frequency division multiple access (OFDM).

A service node is provided to facilitate control and routing of calls involving the mobile terminal. The mobile terminal or terminal adaptor may individually or collectively determine when the mobile terminal is within a zone in which communication via the local wireless access technology is possible, and provide information to the service node bearing on whether the mobile terminal is within or outside of the zone. The information pertaining to the presence of the mobile terminal in the communication zone or other instructions may be provided to the service node over the packet network, via the PSTN, or via the wireless network. The service node may take this information and direct incoming calls to the PSTN directory number for the mobile terminal associated with the terminal adaptor when the mobile terminal is within the zone, and direct calls to the temporary directory number associated with the wireless network when the mobile terminal is outside of the zone. As such, incoming calls are either routed through the wireless network or through the PSTN to the terminal adaptor, depending on whether the terminal adaptor can effectively communicate with the mobile terminal.

Regardless of whether a PSTN call is originated from or received by the mobile terminal via the terminal adaptor, the present invention provides for transferring the connection to the mobile terminal from being established through the wireless network to being established via the terminal adaptor over the PSTN or packet network. An overview of an exemplary network architecture is provided prior to delving into the operation of the preferred embodiments of the present invention.

Figure 1A:
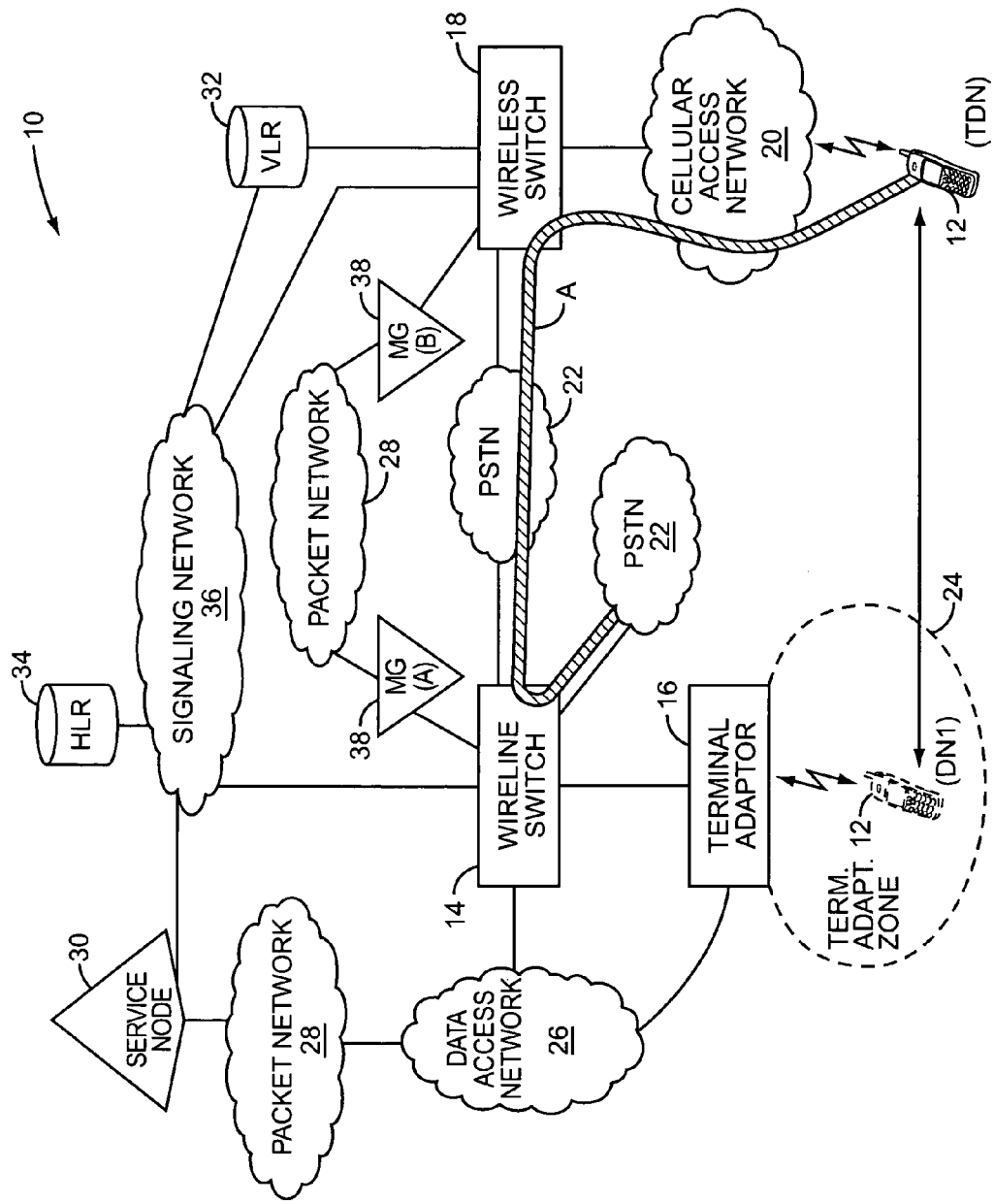
FIG. 1A is a block representation of a communication environment wherein a call is established between the PSTN and a mobile terminal through a cellular access network according to one embodiment of the present invention.

With reference to FIG. 1A, a communication environment 10 allows a mobile terminal 12 to communicate via a wireline switch 14 through a terminal adaptor 16, as well as via a wireless switch 18 through a cellular access network 20. The wireline and wireless switches 14, 18 may be operatively coupled via one or more portions of the public switched telephone networks (PSTN) 22, and may be based on time-division multiplex (TDM) or packet technology. The wireline switch 14 may also be embodied in a private branch exchange (PBX).

The terminal adapter 16 interfaces with a telephone line connected to the wireline switch 14, and facilitates wireless communications with the mobile terminal 12. For an incoming or outgoing call via the telephone line, the terminal adaptor 16 will provide a circuit-switched interface to the telephone line and a local wireless interface to the mobile terminal 12, wherein the mobile terminal 12 may operate analogously to a traditional cordless telephone.

The wireless interface provided by the terminal adaptor 16 will have a limited range, and as such, will provide a terminal adapter zone 24, which defines an area or range in which communications between the terminal adaptor 16 and the mobile terminal 12 are possible. The mobile terminal 12 or the terminal adaptor 16 may individually or collectively, through any of a variety of possible techniques, determine whether the mobile terminal 12 is within the terminal adaptor zone 24, and provide information bearing on the presence of the mobile terminal 12 to a service node 30. The information bearing on the presence of the mobile terminal relative to the terminal adaptor zone 24 may be sent by the terminal adaptor 16 or the mobile terminal 12. The terminal adaptor 16 may send the information to the service node 30 via the wireline switch 14 using appropriate signaling or through a data access network 26 and packet network 28, directly or via customer premise equipment (not shown). The customer premise equipment may be a cable modem, Digital Subscriber Line (DSL) modem, Integrated Services Digital Network (ISDN) modem, or like communication terminal that provides access to the data access network 26 via the corresponding cable network, Digital Subscriber Line (DSL) network, or IDSN forming the data access network 26. The mobile terminal may send information to the service node 30 via the terminal adaptor 16 via the wireline switch 14; over the data access network 26 and packet network 28; or via the cellular access network 20. Attention is directed to U.S. application Ser. No. 10/723,835 filed Nov. 26, 2003 entitled MESSAGING SERVICE INTERWORKING, which is incorporated herein by reference.

The service node 30 is configured to interact with the wireline switch 14 directly or indirectly through a translation device (not shown) to assist in routing incoming calls directed to the mobile terminal 12. Preferably, communications with the wireline switch 14 use Intelligent Network (IN) signaling, and communications with the terminal adaptor 16 are implemented using the Session Initiation Protocol (SIP); however, those skilled in the art will recognize the applicability of alternative signaling technologies and protocols. Alternatively, the service node functionality may be implemented in the wireline switch 14 or other network entity.

In the illustrated embodiment, assume a directory number DN1 is provisioned for the telephony line connected to the terminal adaptor 16, and thus, calls to directory number DN1 will be directed to the mobile terminal 12 via the terminal adaptor 16 when the mobile terminal 12 is within the terminal adaptor zone 24, or ultimately via the cellular access network 20 when the mobile terminal 12 is not within the terminal adaptor zone 24 or as desired by the user. Techniques for routing the call via the cellular access network 20 are described further below.

Incoming calls using the PSTN directory number DN1 are routed to the wireline switch 14, which is provisioned to access the service node 30 to determine how to further route the call for termination. The service node 30 will receive a message from the wireline switch 14 identifying the directory number associated with the called party for the incoming call. From the directory number, the service node 30 will recognize that the directory number DN1 is associated with the mobile terminal 12. As such, the service node 30 will determine whether the mobile terminal 12 is within the terminal adapter zone 24 of the terminal adaptor 16 based on a query to the terminal adaptor 16 or information provided by the terminal adaptor 16 or mobile terminal 12 on a periodic basis. If the mobile terminal 12 is within the terminal adapter zone 24, the service node 30 will send a message to the wireline switch 14 directing the wireline switch 14 to route the incoming call to the mobile terminal 12 via the terminal adaptor 16 using the PSTN directory number DN1. If the mobile terminal 12 is not within the terminal adapter zone 24, the service node 30 will instruct the wireline switch 14 to route the call to the mobile terminal 12 through the cellular access network 20, preferably using a temporary directory number. The temporary directory number is retrieved from the wireless switch 18 or an associated visiting location register (VLR) 32 via a signaling network 36, directly or indirectly via a home location register (HLR) 34 associated with the wireline switch 14.

The VLR 32 generally operates in traditional fashion, and may be specially configured to provide or access the temporary directory number from the wireless switch 18 currently servicing the mobile terminal 12. The HLR 34, although associated with the wireline switch 14, operates in an analogous fashion to a wireless-based HLR 34. In operation, the HLR 34 and VLR 32 cooperate to provide the temporary directory number to the service node 30. The service node 30 will provide the temporary directory number to the wireline switch 14, such that the incoming call can be directed to the wireless switch 18, if the mobile terminal 12 is not within the terminal adaptor zone 24 or as directed by the user. For additional information related to routing incoming calls via the terminal adapter 16 or the wireless network 18, please see U.S. application Ser. No. 10/409,280 filed Apr. 8, 2003 entitled INTEGRATED WIRELINE AND WIRELESS SERVICE; U.S. application Ser. No. 10/409,290 filed Apr. 8, 2003 entitled CALL TRANSFER FOR AN INTEGRATED WIRELINE AND WIRELESS SERVICE; U.S. application Ser. No. 10/410,949 filed Apr. 10, 2003 entitled INTEGRATING TELEPHONE LINES WITH PACKET CONNECTIONS; U.S. application Ser. No. 10/411,159 filed Apr. 10, 2003 entitled INTEGRATING TELEPHONE LINES WITH PACKET CONNECTIONS WITH A TERMINAL ADAPTER; U.S. application Ser. No. 60/472,277 filed May 21, 2003 entitled WLAN CALL HANDOFF TO WIRELESS USING DYNAMICALLY ASSIGNED TEMPORARY NUMBER; U.S. application Ser. No. 10/693,540 filed Oct. 24, 2003 entitled CALL TRANSFER FOR AN INTEGRATED WIRELINE AND WIRELESS SERVICE USING A TEMPORARY DIRECTORY NUMBER; and U.S. application Ser. No. 10/693,539 filed Oct. 24, 2003 entitled CALL TRANSFER FOR AN INTEGRATED WIRELINE AND WIRELESS SERVICE USING A TEMPORARY DIRECTORY NUMBER, the disclosures of which are incorporated herein by reference in their entireties.

The terminal adaptor 16 may support multiple mobile terminals 12, which are capable of establishing telephony communications via the wireless switch 18 or via the wireline switch 14 through the terminal adaptor 16. Accordingly, the terminal adaptor 16 may be able to keep track of the multiple mobile terminals 12 to determine whether they are present within the terminal adapter zone 24 and report such information to the service node 30 periodically or when attempting to terminate an incoming call. Alternatively, the respective mobile terminals 12 will provide such information.

Figure 1B:
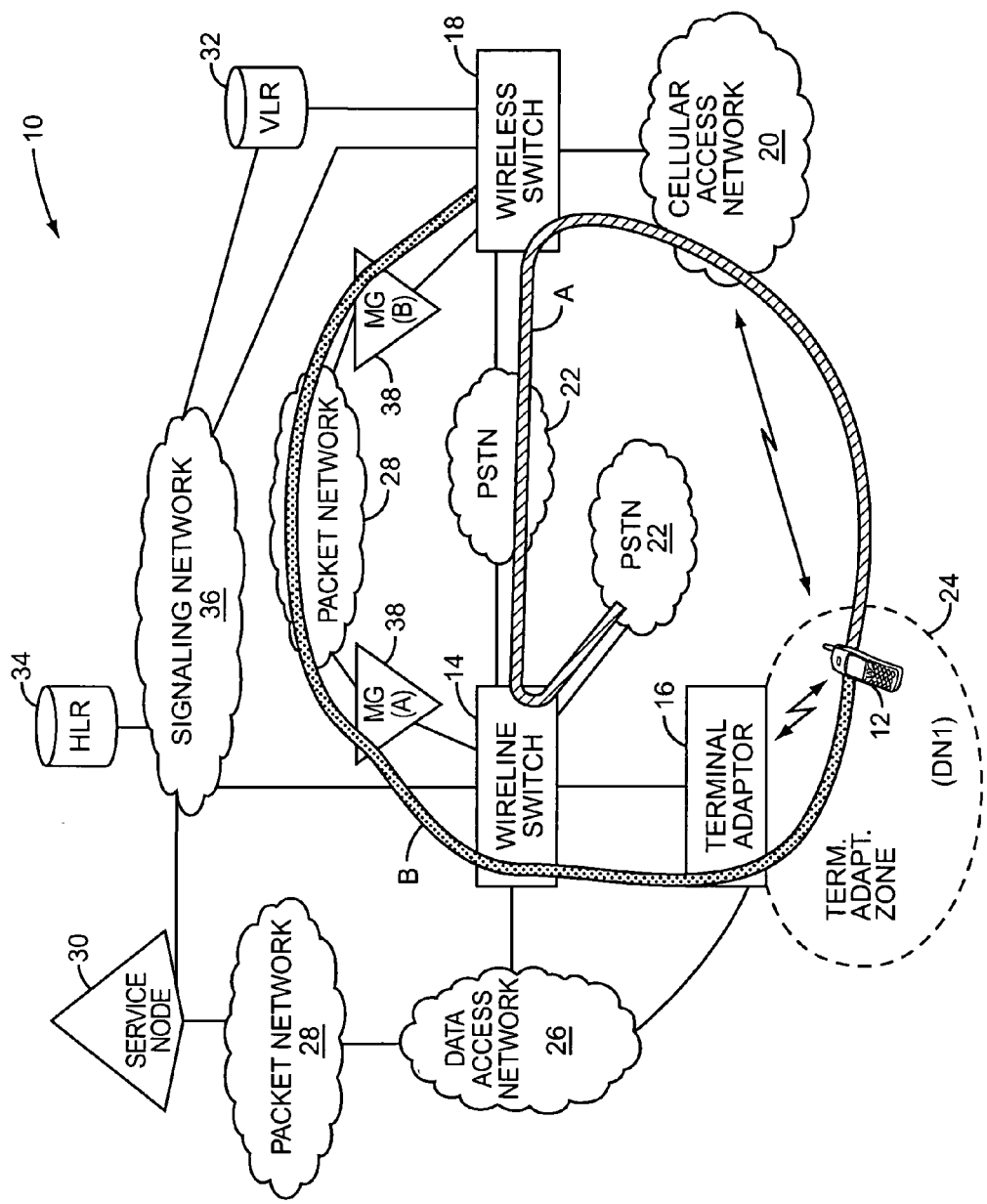
FIG. 1B is a block representation of the communication environment of FIG. 1A wherein a connection is established between a wireless switch, which supports a mobile terminal, and the mobile terminal via a terminal adaptor according to one embodiment of the present invention.
Figure 1C:
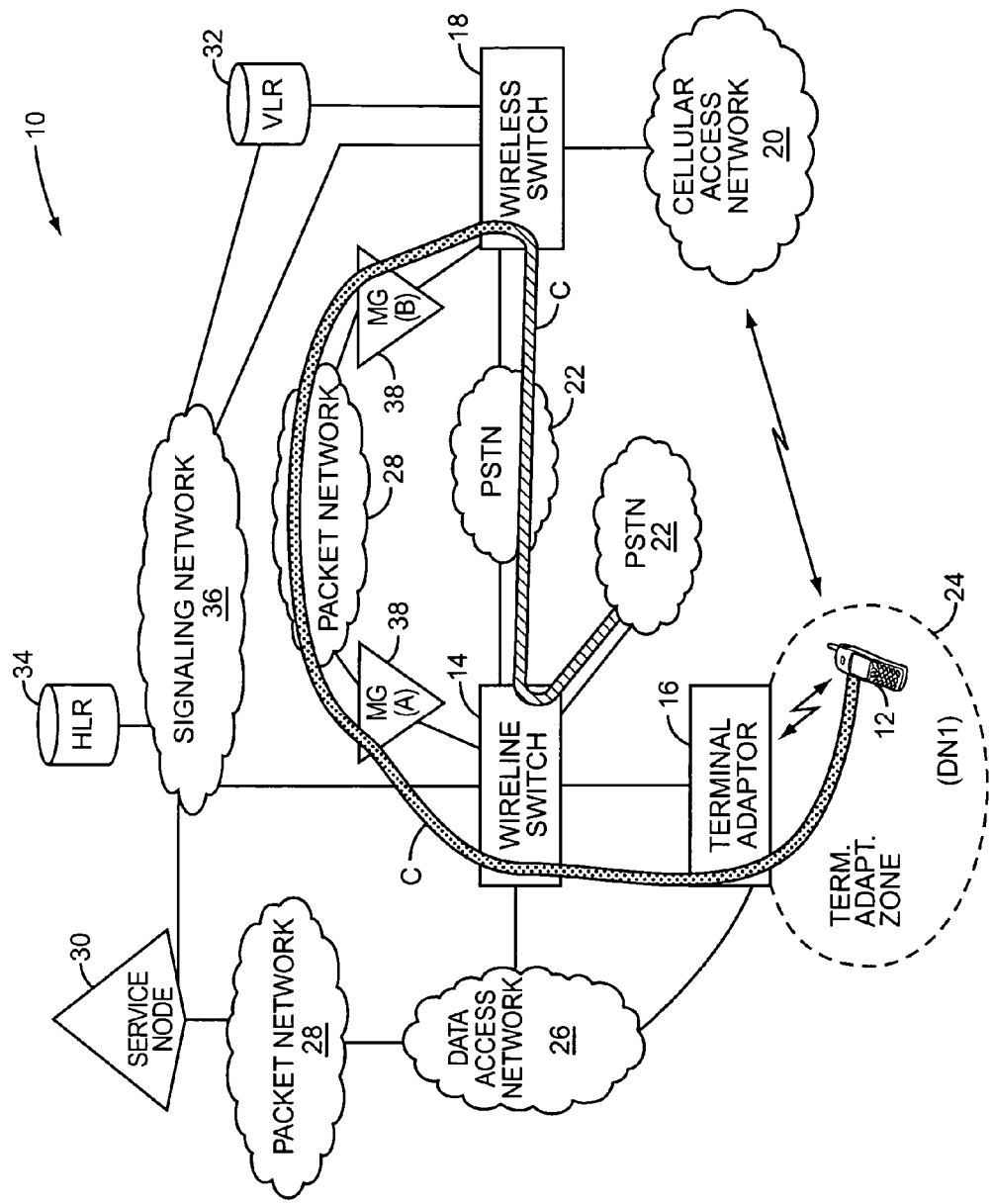
FIG. 1C is a block representation of the communication environment of FIG. 1B wherein the call is transferred to the connection between the wireless switch and the mobile terminal via the terminal adaptor according to one embodiment of the present invention.
Figure 2A:
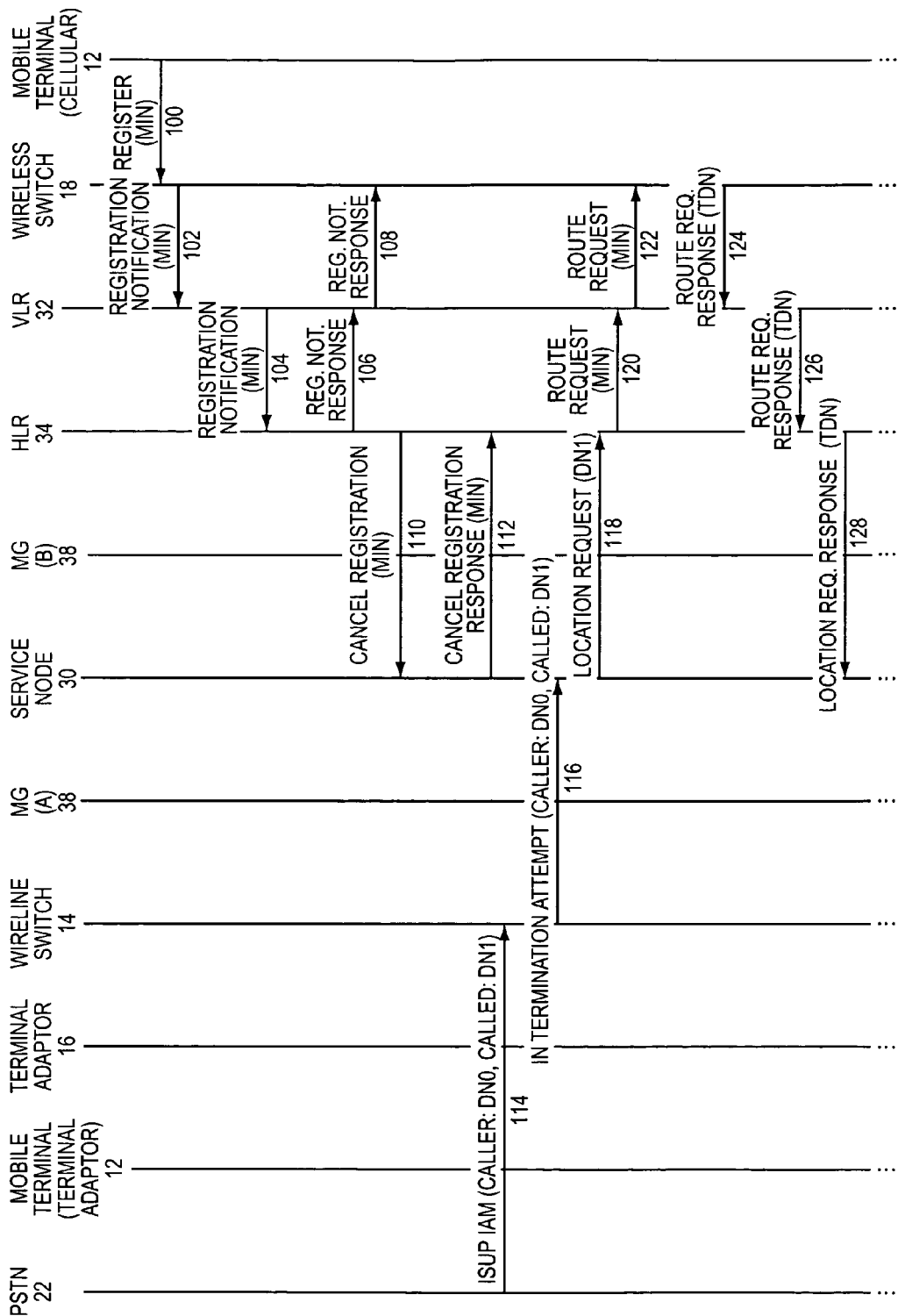
Figure 2B:
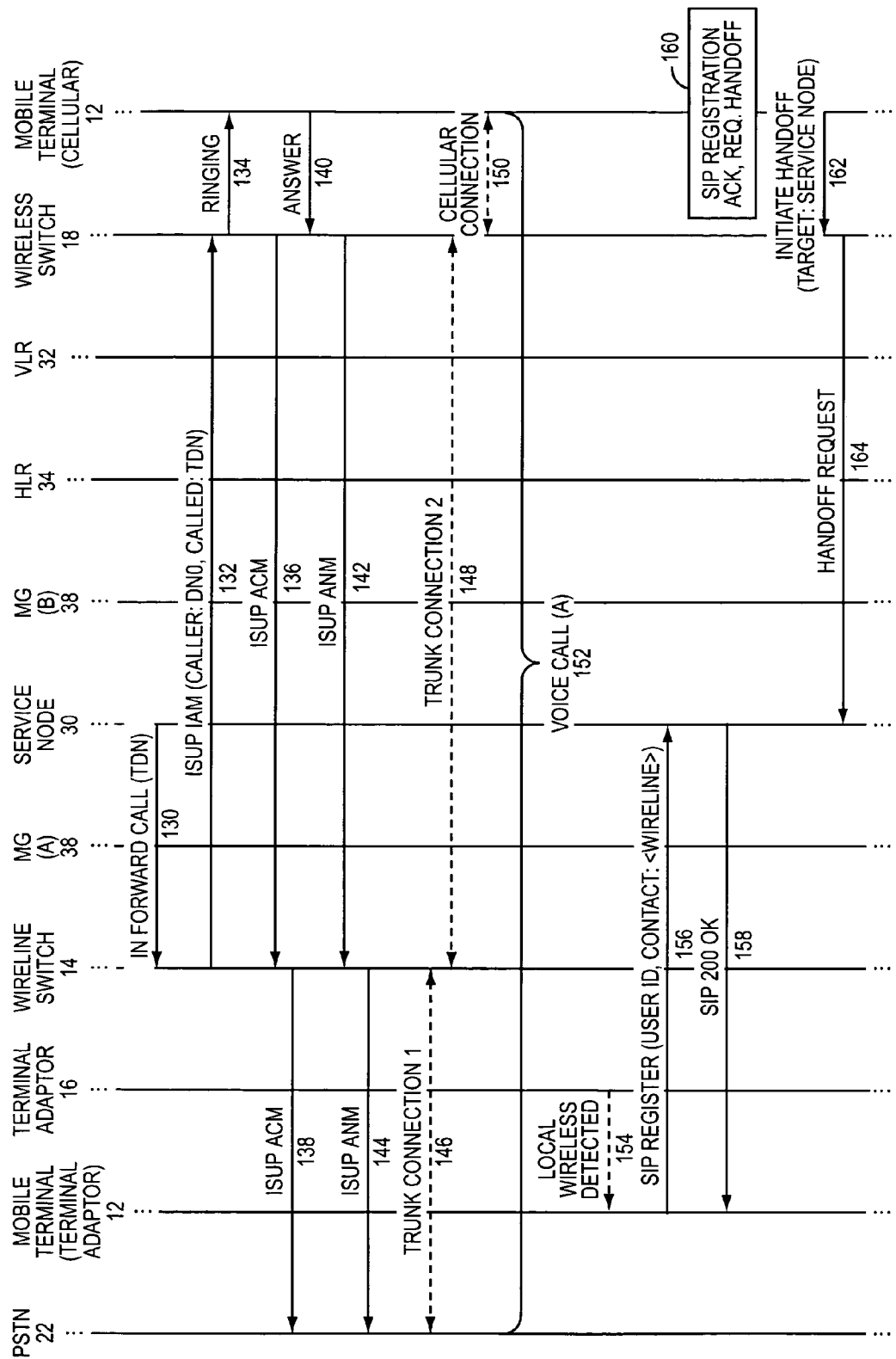
Figure 2C:
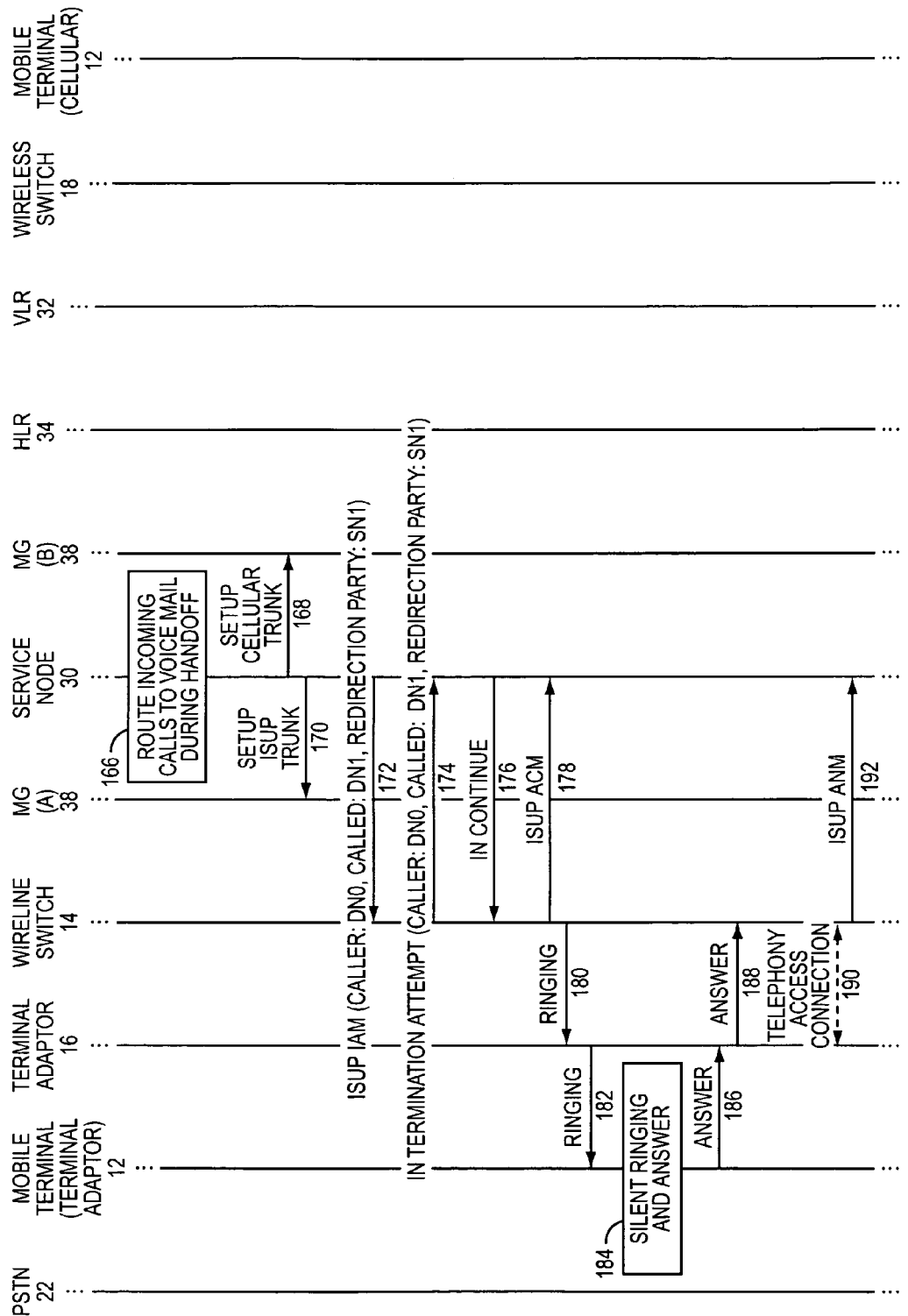
Figure 2D:
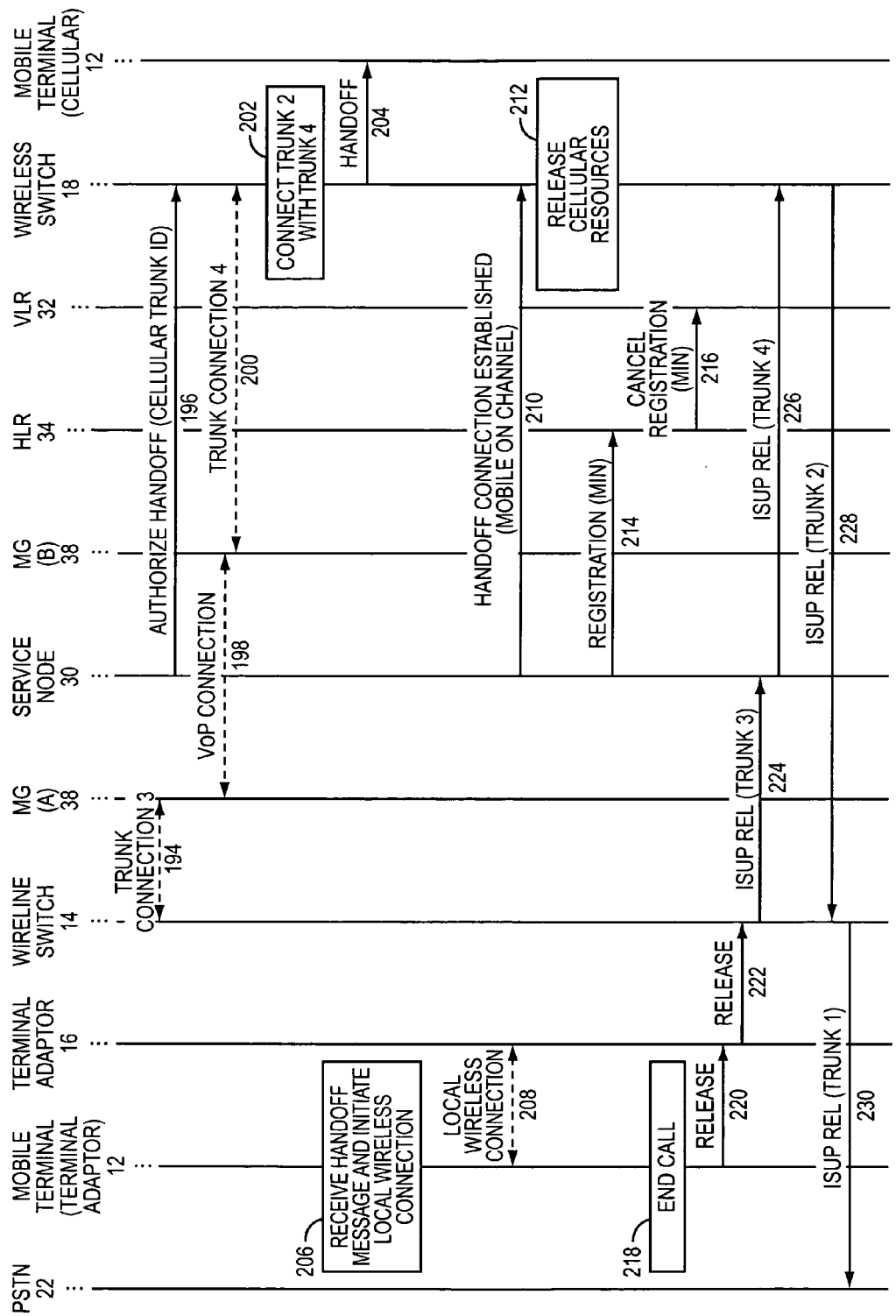

In general, once a call (A) has been established between an entity in the PSTN 22 and the mobile terminal 12 via the wireless switch 18 and the supporting cellular access network 20 (FIG. 1A), the present invention allows the connection to the mobile terminal 12 to be transferred from being established through the cellular access network 20 to being established via the terminal adaptor 16. When the mobile terminal 12 is within the terminal adaptor zone 24 and such handoff is initiated, a new connection (B) from the wireless switch 18 to the mobile terminal 12 via the terminal adaptor 16 is established, as illustrated in FIG. 1B. At this point, the mobile terminal 12 will support the original call via the cellular access network 20, as well as supporting the new connection to the wireless switch 18. Once the new connection via the terminal adaptor 16 is established, the wireless switch 18 can effectively connect the call to the new connection, which connects to the mobile terminal 12 via the terminal adaptor 16, as illustrated in FIG. 1C, to effectively re-establish the call (C) via the PSTN 22 and the mobile terminal 12 and through the terminal adaptor 16.

At this point, the connection between the wireless switch 18 and the mobile terminal 12 via the cellular access network 20 is released, and the mobile terminal 12 will facilitate communications for the call via the local wireless interface instead of via a cellular interface. Notably, the new connection may be established in part between the wireless switch 18 and the wireline switch 14 via the PSTN 22 (not shown) or in part over the packet network 28, wherein media gateways 38A and 38B provide the requisite interfaces to the wireline switch 14 and the wireless switch 18, respectively. The media gateways 38 effectively support interworking between circuit-switched connections with the wireless switch 18 or wireline switch 14 and packet-based sessions over the packet network 28. In one embodiment, telephony trunks normally used to support communications in cellular networks are established between media gateway 38B and the wireless switch 18, and traditional PSTN type trunks are established between the wireline switch 14 and media gateway 38A. Any necessary interworking between the cellular-based trunks and the PSTN-based trunks may be provided by the cooperating media gateways 38A, 38B, which are under the control of the service node 30.

As noted above, the service node 30 may establish and control calls to the mobile terminal 12 in one embodiment of the present invention. With reference to FIGS. 2A-2D, an exemplary communication flow is provided to illustrate one embodiment of the present invention. Initially, a call is established from an entity in the PSTN 22 to the mobile terminal 12 via the wireless switch 18 and the cellular access network 20. During the call, the connection to the mobile terminal 12 is transferred from a connection through the cellular access network 20 to a connection via the terminal adaptor 16, which will use a local wireless interface to support communications with the mobile terminal 12.

Assume the mobile terminal 12 will register with the cellular network. Such registration will alert the cellular network to the presence of the mobile terminal 12 and its ability to initiate and receive calls via the cellular network, and in particular via the wireless switch 18 and the cellular access network 20. For registration, the mobile terminal 12 will send its mobile identification number (MIN) to the wireless switch 18 over the cellular access network 20 using a Register message (step 100). In a CDMA environment, the wireless switch 18 will send the MIN to the supporting VLR 32 using a Registration Notification message (step 102). The VLR 32 will then forward the MIN to the HLR 34 associated with the mobile terminal 12, using a like Registration Notification message (step 104). Notably, the HLR 34 in this embodiment is associated with the wireline switch 14, instead of another wireless switch in the cellular network. The HLR 34 will keep track of the location of the mobile terminal 12 based on information received from the VLR 32 as well as store the user's profile, which defines services available to the mobile terminal 12 or the user, preferably in association with the MIN. The HLR 34 will access the appropriate user profile information based on the MIN, and send a Registration Notification Response to the VLR 32 (step 106), which will forward the MIN and user profile information to the wireless switch 18 in a like Registration Notification Response (step 108).

At this point, the mobile terminal 12 is registered with the cellular network in association with the wireless switch 18. The HLR 34 may send a Cancel Registration message to the service node 30 to cancel any previous registration information provided to the service node 30, and in particular, alert the service node 30 that the mobile terminal 12 has registered with the cellular network (step 110). The service node 30 may send a Cancel Registration Response including the MIN to the HLR 34 as an acknowledgement of receipt of the Cancel Registration message (step 112). At this point, the service node 30 will recognize that the mobile terminal 12 is being serviced via the cellular network.

Assume that a call is initiated from an entity in the PSTN 22, and a corresponding Integrated Services User Part (ISUP) Initial Address Message (IAM) identifying the directory numbers for the caller (DN0) and the called party (DN1), which is the mobile terminal 12, is received by the wireline switch 14 (step 114). The wireline switch 14 will recognize that the service node 30 must be alerted for incoming calls to directory number DN1, and may send an Intelligent Network (IN) Termination Attempt Trigger (TAT) identifying the directory numbers for the caller and called parties to the service node 30 (step 116). The service node 30 will recognize that the mobile terminal 12 is being serviced by the cellular network, and will access the HLR 34 to determine how to route the call through the cellular network. Continuing with the CDMA example, an IS-41 Location Request message identifying directory number DN1 is sent to the HLR 34 (step 118), which will send an IS-41 Route Request message identifying the MIN associated with directory number DN1 to the VLR 32, which is associated with the wireless switch 18 servicing the mobile terminal 12 (step 120). The VLR 32 will send a like Route Request message identifying the MIN for mobile terminal 12 to the wireless switch 18 (step 122), which will assign a temporary directory number (TDN) that will be used to route the call to the mobile terminal 12 via the cellular network. The wireless switch 18 will send the temporary directory number to the VLR 32 using an IS-41 Route Request Response (step 124). The VLR 32 will then send a like Route Request Response including the temporary directory number to the HLR 34, which will send a Location Request Response including the temporary directory number to the service node 30 (step 128).

At this point, the service node 30 will provide the temporary directory number to the wireline switch 14, perhaps in an IN Forward Call message (step 130). In essence, the service node 30 provides instructions to the wireline switch 14 to route the incoming call from directory number DN0 to the temporary directory number associated with the mobile terminal 12 while it is within the cellular network. The wireline switch 14 may then send an ISUP IAM identifying directory number DN0 for the caller and the temporary directory number for the mobile terminal 12 toward the wireless switch 18 (step 132). Once the ISUP IAM is received, the wireless switch 18 will signal the mobile terminal 12 to begin ringing (step 134), as well as send an ISUP Address Complete Message (ACM) to the wireline switch 14 in response to the ISUP IAM (step 136). The wireline switch 14 will forward the ISUP ACM through the PSTN 22 (step 138) toward the telephony switch supporting the originating caller. Once the mobile terminal 12 is answered (step 140), the wireless switch 18 will send an ISUP Answer Message (ANM) toward the wireline switch 14 (step 142), which will forward the ISUP ANM to the telephony switch supporting the originating caller (step 144). At this point, a first trunk connection is established from the caller to the wireline switch 14 through the PSTN 22 (step 146), a second trunk connection is established between the wireline switch 14 and the wireless switch 18 through the PSTN 22 (step 148), and a cellular connection is established between the wireless switch 18 and the mobile terminal 12 (step 150) to facilitate the voice call, which is referenced as call A in FIG. 1A (step 152).

During the call, a decision is made to request a handoff of the connection to the mobile terminal 12 from the cellular access network 20 to the terminal adaptor 16. The decision to initiate the handoff may be made by the user, the terminal adaptor 16, or the mobile terminal 12. If the decision to initiate a handoff is made by the terminal adaptor 16 or the mobile terminal 12, the terminal adaptor 16 or mobile terminal 12 may, alone or in cooperation with one another, determine the mobile terminal 12 is within the terminal adaptor zone 24 and effect delivery of an appropriate message to the service node 30 through the data access network 26, wireline switch 14, or cellular access network 20, depending on the configuration of the terminal adaptor 16, mobile terminal 12, and other entities in the communication environment 10. For example, a handoff may be initiated whenever the mobile terminal 12 is within the terminal adaptor zone 24, when the mobile terminal 12 is within the terminal adaptor zone 24 and the cellular connection is weak, or when the mobile terminal 12 is within the terminal adaptor zone 24 and the user manually requests the handoff.

In the illustrated embodiment, the terminal adaptor 16 is configured to emit a signal that is capable of being received by the mobile terminal 12, which will determine that it is within the terminal adaptor zone 24 when the signal emitted from the terminal adaptor 16 is sufficiently strong (step 154). Once the mobile terminal 12 determines it is within the terminal adaptor zone 24, the mobile terminal 12 will send a message to the service node 30 indicating the same. A Session Initiation Protocol (SIP) Register message is sent to the service node 30 via the terminal adaptor 16, data access network 26, and packet network 28 (step 156). The SIP Register message will include a user identification (User ID) and information indicating the mobile terminal 12 can be contacted via the wireline switch 14. In traditional SIP fashion, the service node 30 will respond with a SIP 200 OK message (step 158). Once the mobile terminal 12 receives acknowledgement that registration with the service node 30 was successful, it may request handoff of the cellular connection to a local wireless connection via the terminal adaptor 16 (step 160). As illustrated, the handoff request from the mobile terminal 12 may identify the service node 30 as the target for the handoff. The service node 30 functions to emulate an adjacent wireless switch to which communications will be transitioned. Accordingly, the service node 30 will appear to support a cell site having a cell site identifier, which is included in the handoff request. The wireless switch 18 will use the cell site identifier to select the service node 30 for the handoff.

The mobile terminal 12 may send an Initiate Handoff message toward the service node 30 via the wireless switch 18 (step 162). The wireless switch 18 will send a Handoff Request, such as by using the IS-41 Facility Directive, which is sent to the service node 30 (step 164). If the mobile terminal 12 does not identify the service node 30 as the handoff recipient, the wireless switch 18 may be provisioned to query the service node 30 to determine if a handoff to the terminal adapter 16 is possible. The service node 30 will recognize a handoff operation is in progress, and may opt to route all incoming calls to the mobile terminal 12 during the handoff to voicemail or otherwise hold the calls until the handoff has been completed (step 166). Assuming that the packet network 28 will support at least a portion of the new connection from the wireless switch 18 to the terminal adaptor 16, the service node 30 will exchange messages with the media gateway 38B to support a cellular-based trunk with the wireless switch 18 (step 168). The service node 30 may also exchange messages with the media gateway 38A to support an ISUP trunk with wireline switch 14 (step 170), as well as send an ISUP IAM to the wireline switch 14 identifying the caller's directory number DN0, the directory number DN1 associated with the mobile terminal 12, and provide an indication via the redirection party parameter that call control has transited via the service node 30 which has an identification of SN1 (step 172). As described in previously incorporated applications, the wireline switch 14 may be configured to send an IN Termination Attempt Trigger to the service node 30 (step 174) to indicate a new incoming call. Because of the redirection party parameter is set to SN1, the service node 30 will recognize the call as a known call. Because it is a known call, the service node 30 will send an IN Continue message to the wireline switch 14 (step 176), which will respond with an ISUP ACM that is sent to the service node 30 (step 178).

At this point, the wireline switch 14 will initiate ringing of the terminal adaptor 16 (step 180), which will recognize the ringing signal from the wireline switch 14 and instruct the mobile terminal 12 to ring (step 182). In one embodiment, the mobile terminal 12 will recognize that it is currently engaged in a cellular call and that the incoming call is the new connection to which the cellular call will be transferred, such as recognizing information provided in caller identification information sent with the ringing signal. As such, the mobile terminal 12 may initiate silent ringing and answer the incoming call using the local wireless interface (step 184). The mobile terminal 12 will send an Answer indication to the terminal adaptor 16 (step 186), which will send an appropriate signal, such as going off hook, to the wireline switch 14 (step 188), establishing a telephony access connection between the terminal adaptor 16 and the wireline switch 14 (step 190). The wireline switch 14 will send an ISUP Answer Message (ANM) to the service node 30 (step 192), as well as establish a third trunk connection with media gateway 38A (step 194).

In the meantime, the service node 30 will send an Authorize Handoff message to the wireless switch 18, such as through an IS-41 Facility Directive, which will include the cellular trunk ID for media gateway 38B (step 196). Media gateways 38A and 38B will establish a voice over packet (VoP) connection over the packet network 28 (step 198), and media gateway 38B and the wireless switch 18 will establish a fourth trunk connection therebetween (step 200). At this point, a communication connection is established between the terminal adaptor 16 and the wireless switch 18 through the wireline switch 14, media gateway 38A, and media gateway 38B. The wireless switch 18 will then connect the second and fourth trunk connections to effectively connect the leg of the call extending from the original caller to the wireless switch 18 to the new connection to the terminal adaptor 16 (step 202). The wireless switch 18 will then send a Handoff message to the mobile terminal 12 via the cellular network (step 204). The mobile terminal 12 will receive the Handoff message and initiate a local wireless connection with the terminal adaptor 16 (step 206). Once the local wireless connection between the mobile terminal 12 and the terminal adaptor 16 is established (step 208), the connection from the mobile terminal 12 via the terminal adaptor 16 extends through the media gateways 38A and 38B, and the wireless switch 18 to the original caller.

Either after a predefined period of time or upon receiving an indication from the terminal adaptor 16 or the mobile terminal 12 (not shown), the service node 30 may send a message to the wireless switch 18 indicating that the handoff connection has been established (step 210). Such information may be provided to the wireless switch 18 in the form of an IS-41 Mobile On Channel message. Upon receiving this information, the wireless switch 18 will take the necessary steps to release the cellular resources used to provide a cellular connection to the mobile terminal 12 (step 212). The service node 30 may also send a Registration message to the HLR 34 indicating that the mobile terminal 12 is being supported by the wireline switch 14 (step 214). The HLR 34 may then take the necessary steps to cancel registration for the mobile terminal 12 with the VLR 32 (step 216).

Assuming the user of mobile terminal 12 ends the call (step 218), the mobile terminal 12 will send a Release message to the terminal adaptor 16, which will release the local wireless connection (step 220). The terminal adaptor 16 will then send a Release message or go on hook to instruct the wireline switch 14 to release the telephony access connection (step 222). The wireline switch 14 will then send an ISUP Release (REL) message to the service node 30 to effectively release the third trunk connection (step 224). The service node 30 will send an ISUP Release message to the wireless switch 18 to release the fourth trunk connection (step 226). The wireless switch 18 may then send an ISUP Release message toward the wireline switch 14 to release the second trunk connection (step 228). The wireline switch 14 can then send an ISUP Release message toward the telephony switch for the originating user to release the first trunk connection (step 230). At this point, all connections for the call are released.

From the above, it should be clear that the service node 30 and the HLR 34 cooperate with the wireline switch 14 to emulate another wireless switch in the cellular network. Accordingly, the wireless switch 18 currently supporting the call may function in a manner similar to transferring the call to another wireless switch when the call is transferred to the terminal adaptor 16. Further, the transfer of the call through the packet network 28 using the media gateways 38A and 38B provides an efficient mechanism for allowing the PSTN-based trunks and the cellular-based trunks that connect to the wireline switch 14 and the wireless switch 18, respectively, to interwork with one another. In essence, media gateway 38A provides conversion from the PSTN-based trunk circuits to a voice over packet (VoP) session, which is converted to a cellular-based trunk connection using media gateway 38B. Alternatively, the new connection from the wireless switch 18 to the wireline switch 14 may be established through the PSTN 22 in traditional fashion.

With reference to FIG. 3, the new connection between the wireless switch 18 and the terminal adaptor 16 may be provided predominantly over the packet network 28. As illustrated, media gateway 38B will provide interworking between the packet network 28 and the wireless switch 18. The terminal adaptor 16 will be coupled to the packet network 28 via the data access network 26. The initial call connection (D) will extend through the wireless switch 18 to the mobile terminal 12 via the cellular access network 20. In this embodiment, the service node 30 will convert a handoff request received from the wireless switch 18 into a session origination message, such as a SIP Invite message, intended for the mobile terminal 12 and configured to establish a packet session between the media gateway 38B and the mobile terminal 12. The service node 30 will confirm the handoff when the packet session is established. The connection to which the call is transferred (E) will extend from the wireless switch 18 through media gateway 38B, packet network 28, data access network 26, and the terminal adaptor 16, prior to being connected to the mobile terminal 12 via a local wireless connection. Those skilled in the art will recognize that the incoming call may originate from any device on the PSTN 22, data access network 26, or packet network 28. Any of these connections can be routed through the wireless switch 18, which will assist in transferring the call to a new connection established with the mobile terminal 12 via the terminal adaptor 16 through a wireline, wireless, or packet-based connection.

A block representation of the terminal adaptor 16 is provided in FIG. 4. Preferably, the terminal adaptor 16 will include a control system 40 operatively associated with a local wireless interface 42, one or more telephony line interfaces 44, an Ethernet interface 46, and a signal processing function 48. The signal processing function 48 is part of the control system 40, and is capable of providing all the necessary coding, decoding, and conversions necessary for either of the telephony line interface 44 and an optional Ethernet interface 46 to operate with the local wireless interface 42. The local wireless interface 42 is associated with an antenna 50, and is configured to communicate wirelessly with the mobile terminal 12 using any applicable wireless technology, such as traditional analog or digital cordless technology, wireless local area network technology including 802.11-based technologies, and Bluetooth technology.

Clearly, the mobile terminal 12 must be equipped with a compatible interface and be configured to cooperate with the terminal adaptor 16 to facilitate normal telephone operation. As such, the terminal adaptor 16 and the mobile terminal 12 must cooperate such that the mobile terminal 12 knows when to ring, the terminal adaptor 16 knows when the mobile terminal 12 has been answered or ends a call, and the mobile terminal 12 receives any caller identification or like messaging intended for the user or necessary by the mobile terminal 12 for operation. Further, the local wireless interface 42, alone or in conjunction with the control system 40, must be able to periodically or continuously detect whether the mobile terminal 12 is within communication range, and thus within the terminal adapter zone 24. Those skilled in the art will recognize numerous techniques for the mobile terminal 12 and terminal adaptor 16 to cooperate with one another to determine whether or not communications are possible.

Turning now to FIG. 5, a block diagram of a service node 30 is illustrated. The service node 30 will preferably include a control system 52 having sufficient memory 54 to store the software 56 necessary for operation as described above. The control system 52 is also associated with one or more packet interfaces 58 to facilitate communications with the terminal adaptor 16 via the packet network 28, as well as directly or indirectly with the wireline switch 14.

The basic architecture of the mobile terminal 12 is represented in FIG. 6 and may include a receiver front end 60, a radio frequency transmitter section 62, an antenna 64, a duplexer or switch 66, a baseband processor 68, a control system 70, a frequency synthesizer 72, and an interface 74. The receiver front end 60 receives information bearing radio frequency signals from one or more remote transmitters provided by a base station. A low noise amplifier 76 amplifies the signal. A filter circuit 78 minimizes broadband interference in the received signal, while downconversion and digitization circuitry 80 downconverts the filtered, received signal to an intermediate or baseband frequency signal, which is then digitized into one or more digital streams. The receiver front end 60 typically uses one or more mixing frequencies generated by the frequency synthesizer 72. The baseband processor 68 processes the digitized received signal to extract the information or data bits conveyed in the received signal. This processing typically comprises demodulation, decoding, and error correction operations. As such, the baseband processor 68 is generally implemented in one or more digital signal processors (DSPs).

On the transmit side, the baseband processor 68 receives digitized data, which may represent voice, data, or control information, from the control system 70, which it encodes for transmission. The encoded data is output to the transmitter 62, where it is used by a modulator 82 to modulate a carrier signal that is at a desired transmit frequency. Power amplifier circuitry 84 amplifies the modulated carrier signal to a level appropriate for transmission, and delivers the amplified and modulated carrier signal to the antenna 64 through the duplexer or switch 66.

As noted above, the mobile terminal 12 must be able to communicate with the terminal adaptor 16 as well as with the cellular access network 20. Accordingly, the receiver front end 60, baseband processor 68, and radio frequency transmitter section 62 cooperate to provide either a cellular interface for the wireless access network 20 and the local wireless interface 42 for the terminal adaptor 16. These functions may be implemented using redundant circuitry, or by configuring common circuitry to operate in different modes. The configuration of the mobile terminal 12 will be dictated by economics and designer choice. The mobile terminal 12 is configured such that if the local wireless interface 42 is not functional, communications are switched to the wireless network interface. Alternatively, the mobile terminal 12 could have both the local wireless interface 42 and the wireless network interface in operation at the same time and select one of the two for communication at any given time based on signal quality, registration, or other factors.

A user may interact with the mobile terminal 12 via the interface 74, which may include interface circuitry 86 associated with a microphone 88, a speaker 90, a keypad 92, and a display 94. The interface circuitry 86 typically includes analog-to-digital converters, digital-to-analog converters, amplifiers, and the like. Additionally, it may include a voice encoder/decoder, in which case it may communicate directly with the baseband processor 68. The microphone 88 will typically convert audio input, such as the user's voice, into an electrical signal, which is then digitized and passed directly or indirectly to the baseband processor 68. Audio information encoded in the received signal is recovered by the baseband processor 68, and converted by the interface circuitry 86 into an analog signal suitable for driving the speaker 90. The keypad 92 and display 94 enable the user to interact with the mobile terminal 12, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A method for transitioning a call with a mobile terminal from a cellular connection to a local wireless connection other than a cellular connection, the method comprising:
   a) receiving an inter-switch handoff request from a wireless switch supporting a call to the mobile terminal over a cellular access network, the call comprising a first connection from the wireless switch to the mobile terminal and a second connection between the wireless switch and an entity;
   b) effecting establishment of an inter-switch handoff connection to the mobile terminal via a terminal adaptor, which supports local wireless communications with the mobile terminal, wherein the local wireless communications supported by the terminal adaptor comprise communications other than cellular communications;
c) providing an inter-switch handoff instruction to the wireless switch to connect the second connection and the inter-switch handoff connection to effect handoff of the call from the cellular connection to the local wireless connection, wherein the local wireless connection is not a cellular connection;
d) wherein the inter-switch handoff connection is established in part between first and second media gateways, and the first and second media gateways facilitate interworking between a cellular-based trunk and a public switched telephone network-based trunk over a packet network; and
e) wherein the inter-switch handoff request is received and the inter-switch handoff instruction is provided using a cellular protocol while the establishment of the inter-switch handoff connection is effected using a packet-based communication session protocol.

2. The method of claim 1 wherein the inter-switch handoff connection is established in part between a wireline switch and the terminal adaptor.

3. The method of claim 2 wherein the first media is gateway connected to the wireless switch via the cellular-based trunk and the second media gateway is connected to the wireline switch via the public switched telephone network-based trunk, the method further comprising sending call initiation messages to the first and second media gateways and the wireline switch to establish the inter-switch handoff connection.

4. The method of claim 2 wherein the inter-switch handoff connection is established using a directory number associated with the mobile terminal when supported via the terminal adaptor.

5. The method of claim 1 wherein the inter-switch handoff connection is established in part over the packet network, wherein the packet network is operatively coupled to the terminal adaptor.

6. The method of claim 5 wherein the inter-switch handoff connection is established in part between a first media gateway and the mobile terminal through the terminal adaptor, the first media gateway connected to the wireless switch via a cellular-based trunk, the method further comprising sending control messages to the first media gateway and the mobile terminal to establish the inter-switch handoff connection.

7. The method of claim 6 wherein the first media gateway facilitates interworking between the cellular-based trunk and a packet-based session forming part of the inter-switch handoff connection.

8. The method of claim 1 further comprising providing a inter-switch handoff message to the wireless switch to confirm handoff to the inter-switch handoff connection.

9. The method of claim 1 wherein the inter-switch handoff request comprises a cell site identifier to which the wireless switch is attempting to handoff the call, the cell site identifier corresponding to the terminal adaptor.

10. The method of claim 9 wherein the cell site identifier is provided to the wireless switch by the mobile terminal.

11. The method of claim 9 wherein the wireless switch accesses the cell site identifier upon receiving the inter-switch handoff request from the mobile terminal.

12. The method of claim 11 further comprising providing the cell site identifier to the wireless switch.

13. The method of claim 1, wherein the local wireless communications supported by the terminal adaptor comprise cordless telephone technologies.

14. The method of claim 1, wherein the local wireless communications supported by the terminal adaptor comprise 802.11 wireless local area network technologies.

15. The method of claim 1, wherein the local wireless communications supported by the terminal adaptor comprise Bluetooth technology.

16. The method of claim 1, wherein the terminal adaptor is configured to interface with a communication line connected to a wireline switch such that the terminal adapter provides a circuit-switched interface to the communication line and a local wireless interface to the mobile terminal.

17. A system for transitioning a call with a mobile terminal from a cellular connection to a local wireless connection other than a cellular connection, the system comprising:
a) at least one communication interface;
b) a control system associated with the at least one communication interface and adapted to:
i) receive an inter-switch handoff request from a wireless switch supporting a call to the mobile terminal over a cellular access network, the call comprising a first connection from the wireless switch to the mobile terminal and a second connection between the wireless switch and an entity;
ii) effect establishment of an inter-switch handoff connection to the mobile terminal via a terminal adaptor, which supports local wireless communications with the mobile terminal, wherein the local wireless communications supported by the terminal adaptor comprise communications other than cellular communications;
iii) provide an inter-switch handoff instruction to the wireless switch to connect the second connection and the inter-switch handoff connection to effect handoff of the call from the cellular connection to the local wireless connection, wherein the local wireless connection is not a cellular connection;
iv) wherein the inter-switch handoff connection is established in part between first and second media gateways, and the first and second media gateways facilitate interworking between a cellular-based trunk and a public switched telephone network-based trunk over a packet network; and
v) wherein the inter-switch handoff request is received and the inter-switch handoff instruction is provided using a cellular protocol while the establishment of the inter-switch handoff connection is effected using a packet-based communication session protocol.

18. The system of claim 17 wherein the inter-switch handoff connection is established in part between a wireline switch and the terminal adaptor.

19. The system of claim 18 the first media gateway is connected to the wireless switch via the cellular-based trunk and the second media gateway is connected to the wireline switch via the public switched telephone network-based trunk, the control system further adapted to send control messages to the first and second media gateways and the wireline switch to establish the inter-switch handoff connection.

20. The system of claim 18 wherein the inter-switch handoff connection is established using a directory number associated with the mobile terminal when supported via the terminal adaptor.

21. The system of claim 18 wherein the inter-switch handoff connection is established in part over the packet network, wherein the packet network is operatively coupled to the terminal adaptor.

22. The system of claim 21 wherein the inter-switch handoff connection is established in part between a first media gateway and the mobile terminal through the terminal adaptor, the first media gateway connected to the wireless switch via a cellular-based trunk, the control system further adapted to send control messages to the first media gateway and the mobile terminal to establish the inter-switch handoff connection.

23. The system of claim 22 wherein the first media gateway facilitates interworking between the cellular-based trunk and a packet-based session forming part of the inter-switch handoff connection.

24. The system of claim 17 further comprising providing a inter-switch handoff message to the wireless switch to confirm handoff to the inter-switch handoff connection.

25. The system of claim 17 wherein the inter-switch handoff request comprises a cell site identifier to which the wireless switch is attempting to handoff the call, the cell site identifier corresponding to the terminal adaptor.

26. The system of claim 25 wherein the cell site identifier is provided to the wireless switch by the mobile terminal.

27. The system of claim 25 wherein the wireless switch accesses the cell site identifier upon receiving the inter-switch handoff request from the mobile terminal.

28. The system of claim 27 wherein the control system is further adapted to provide the cell site identifier to the wireless switch.

29. The system of claim 17, wherein the local wireless communications supported by the terminal adaptor comprise cordless telephone technologies.

30. The system of claim 17, wherein the local wireless communications supported by the terminal adaptor comprise 802.11 wireless local area network technologies.

31. The system of claim 17, wherein the local wireless communications supported by the terminal adaptor comprise Bluetooth technology.

32. The system of claim 17, wherein the terminal adaptor is configured to interface with a communication line connected to a wireline switch such that the terminal adapter provides a circuit-switched interface to the communication line and a local wireless interface to the mobile terminal.

33. A method for transitioning a call with a mobile terminal from a cellular connection to a local wireless connection other than a cellular connection, the method comprising:
　　a) receiving an inter-switch handoff request from a wireless switch supporting a call to the mobile terminal over a cellular access network, the call comprising a first connection from the wireless switch to the mobile terminal and a second connection between the wireless switch and an entity;
　　b) effecting establishment of an inter-switch handoff connection to the mobile terminal via a terminal adaptor, which supports local wireless communications with the mobile terminal, wherein the local wireless communications supported by the terminal adaptor comprise communications other than cellular communications;
　　c) providing an inter-switch handoff instruction to the wireless switch to connect the second connection and the inter-switch handoff connection to effect handoff of the call from the cellular connection to the local wireless connection, wherein the local wireless connection is not a cellular connection;
　　d) wherein the inter-switch handoff connection is established in part between first and second media gateways, and the first and second media gateways facilitate interworking between a cellular-based trunk and a public switched telephone network-based trunk over a packet network; and
　　e) wherein the terminal adaptor is configured to interface with a communication line connected to a wireline switch such that the terminal adapter provides a circuit-switched interface to the communication line and a local wireless interface to the mobile terminal.

\* \* \* \* \*